Aug. 2, 1932.  D. L. CRAMP  1,869,546

BRAKE RUBBING ROTOR

Filed July 15, 1931

INVENTOR
D. L. Cramp
BY E. J. Fetherstonhaugh
ATTORNEY.

Patented Aug. 2, 1932

1,869,546

UNITED STATES PATENT OFFICE

DAVID LEO CRAMP, OF KIRKLAND LAKE, ONTARIO, CANADA

BRAKE RUBBING ROTOR

Application filed July 15, 1931. Serial No. 550,928.

The invention relates to a brake rubbing rotor, as described in the present specification and illustrated in the accompanying drawing which forms part of the same.

The invention consists essentially of the adapatation of the principle of cooling with air the rubbing member or members as pointed out in the claims for novelty following a description containing an explanation in detail of an acceptable form of the invention.

The objects of the invention are to increase the efficiency in brake drums, as used in hoisting and other apparatus; to eliminate as much as possible the over-heating of the brake drum, thereby avoiding the distortion customarily caused by the application of the brake band or shoe to the drum; to equalize the application of the brake to the rubbing surface and in fact insure uniform pressure throughout; to lengthen the life of a brake drum and minimize delays and accidents in mines and other places through repairs to the various mechanisms; to furnish an efficient braking system to stationary and portable plants or to any running gear; and generally to provide a brake drum constantly efficient in service and durable in construction.

In the drawing, Figure 1 is a side elevational view of the brake drum.

Like numerals of reference indicate corresponding parts in the various figures.

Figure 1:
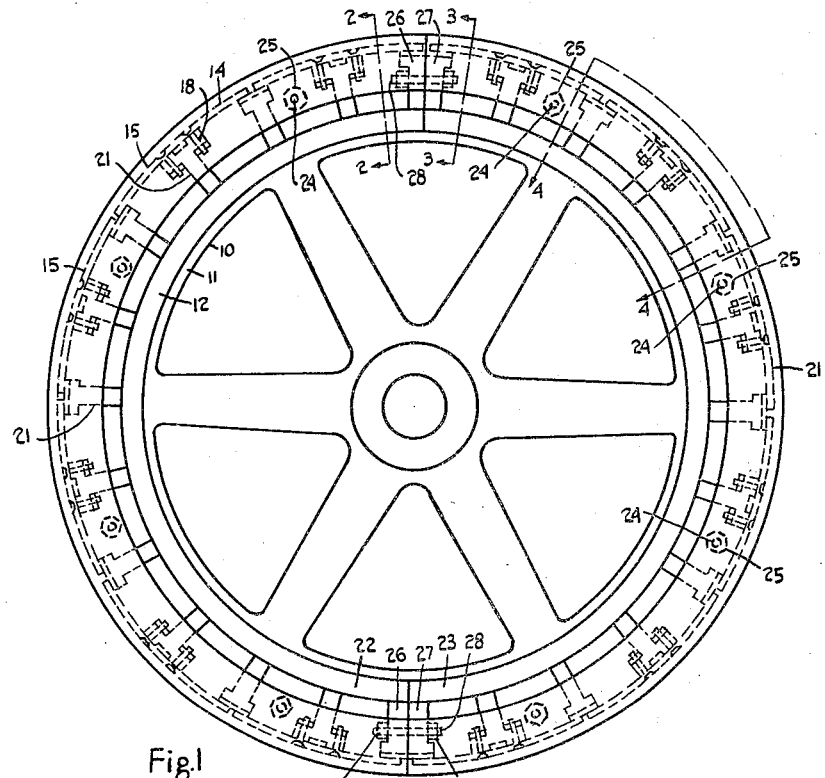
Figure 2:
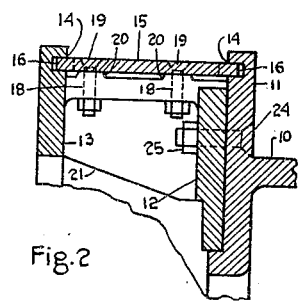
Figure 2 is an enlarged cross sectional view of the brake drum taken on the lines 2—2 in Figure 1.
Figure 4:
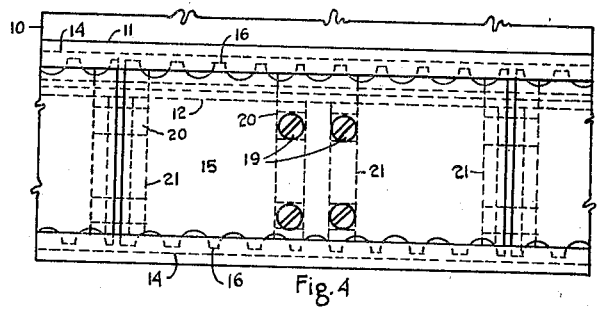
Figure 4 is a fragmentary plan view taken on the lines 4—4 in Figure 1 showing the means for fastening the rubbing plates to the drum, and the expansion joints.
Figure 3:
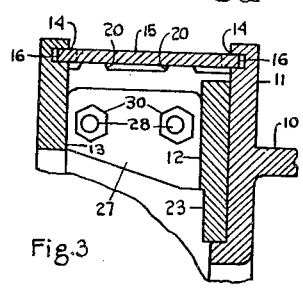
Figure 3 is an enlarged cross sectional view of the brake drum taken on the lines 3—3 in Figure 1.
Figure 5:
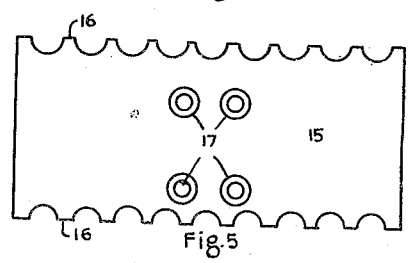
Figure 5 is a plan view of a rubbing plate.

Referring to the drawing, the rotor 10 may be in drum form or in wheel form as shown and so connected with the part or machinery to be braked as to rub the brake shoe or brake band when applied.

This rotor is formed with a channelled rim 11 having an annular bed 12 and wall 13 and the annular slots 14 in the wall 13 and channelled rim 11 into which the arcuate rubbing plates 15 are introduced and suitably spaced.

Tht rubbing plates 15 have the scalloped-edges 16 and a plurality of orifices 17 centrally disposed therein and through which are inserted the bolts 18 having their heads 19 countersunk in convex or rubbing surfaces of the plates 15 and extend through the bosses 20 of the T-shaped brackets 21 which are in turn secured to the annular bed 12 and the wall 13.

There are a series of these arcuate rubbing plates 15 around the circumference of the rotor 10 and each of these rubbing plates are secured at the center to the T-shaped brackets so as to permit the expansion and contraction of the plates on either sides, the ends of the plates being supported on bosses of others of the T-shaped brackets without being secured thereto, space being provided between the end of the adjacent plates over the T-shaped brackets for their expansion and contraction.

The annular bed 12 and the wall 13 are casted together through the T-shaped brackets 21 and may be formed into a plurality of sections for the purpose of easy transportation and as shown in the drawing, they are formed in two sections 22 and 23. The annular bed 12 is secured to the channelled rim 11 of the rotor 10 by means of the bolts 24 and the nuts 25.

The two sections 22 and 23 are fastened together by means of the double brackets 26 and 27 which are fastened together through the double threaded bolts 28 locked in position by means of the nuts 29 and 30.

From the above it will be seen that by the use of these arcuate rubbing plates, a complete circulation of air is made throughout the circumference of the rotor so that when the brake shoe or brake band comes into engagement with the rubbing plates for stopping the rotation of the brake or other piece of machinery, the friction caused by the contact and which is transformed into heat will be disbursed through the scalloped edges of the plates as well as through the air space formed between the T-shaped brackets and the plates and whatever heat that remains which may force the expansion of the plates, space is provided for such expansion within the annular slots in the wall and the channelled rim of the rotor and naturally when the heat has disbursed, the plates will contract again.

In this way there is no possible danger of the brake or wall from being distorted and thereby eliminating delays and repairs and other incidentals in heating arrangements or wherever a brake drum is utilized.

What I claim is:

1. A brake rubbing rotor comprising a channelled rim suitably supported for rotation, an annular bed secured to said channelled rim and rigidly secured to an outer wall spaced therefrom by a plurality of brackets, spaced arcuate rubbing plates introduced in said channelled rim and said outer wall and rigidly secured.

2. A brake rubbing rotor comprising a channelled rim suitably supported for rotation, an inner annular bed bolted to said channelled rim and an outer wall integrally secured to an annular bed by a plurality of T-shaped brackets having bosses, spaced arcuate rubbing plates mounted and secured to the brackets through said bosses and introduced in said channelled rim and outer wall and rigidly secured.

3. A brake rubbing rotor comprising a channelled rim suitably supported for rotation, an annular bed secured to said channelled rim and connected to an outer wall through brackets forming an integral part of the annular bed and wall, said annular bed and wall being formed of a plurality of sections connected together by double brackets fastened together through double threaded bolts and nuts, and spaced arcuate rubbing plates introduced in said channelled rim and wall and rigidly secured.

4. A brake rubbing rotor comprising a channelled rim suitably supported for rotation and spaced arcuate rubbing plates introduced in said channel and rigidly secured and formed with scalloped edges.

5. A brake rubbing rotor comprising a channelled rim suitably supported for rotation and spaced arcuate rubbing plates introduced in said channel and rigidly secured and having scalloped edges and central orifices centrally disposed therein.

6. A brake rubbing rotor comprising a channelled rim suitably supported for rotation and having an annular slot, an annular bed secured to said channel rim and an outer wall having an annular slot corresponding to the annular slot of said channelled rim and casted to said annular bed through a plurality of brackets, the latter having bosses, spaced arcuate rubbing plates having scalloped edges and central orifices mounted on said brackets and secured thereto and having its scalloped edges introduced in the annular slots of said channelled rim and outer wall.

7. A brake rubbing rotor comprising a channelled rim suitably supported for rotation, and having an inner and outer circular wall connected together by means of a plurality of T-shaped brackets and spaced arcuate rubbing plates secured to said brackets and forming a brake path therearound and introduced in annular slots in said channelled rim and outer wall.

Signed at Kirkland Lake, Canada, this 11th day of June, 1931.

DAVID LEO CRAMP.